Nov. 20, 1928.

J. OAKLEY 1,692,564

BROACHING MACHINE

Filed Sept. 22, 1926   2 Sheets-Sheet 1

INVENTOR.
John Oakley.
BY Frank A. Cutter,
ATTORNEY.

Nov. 20, 1928.
J. OAKLEY
BROACHING MACHINE
Filed Sept. 22, 1926
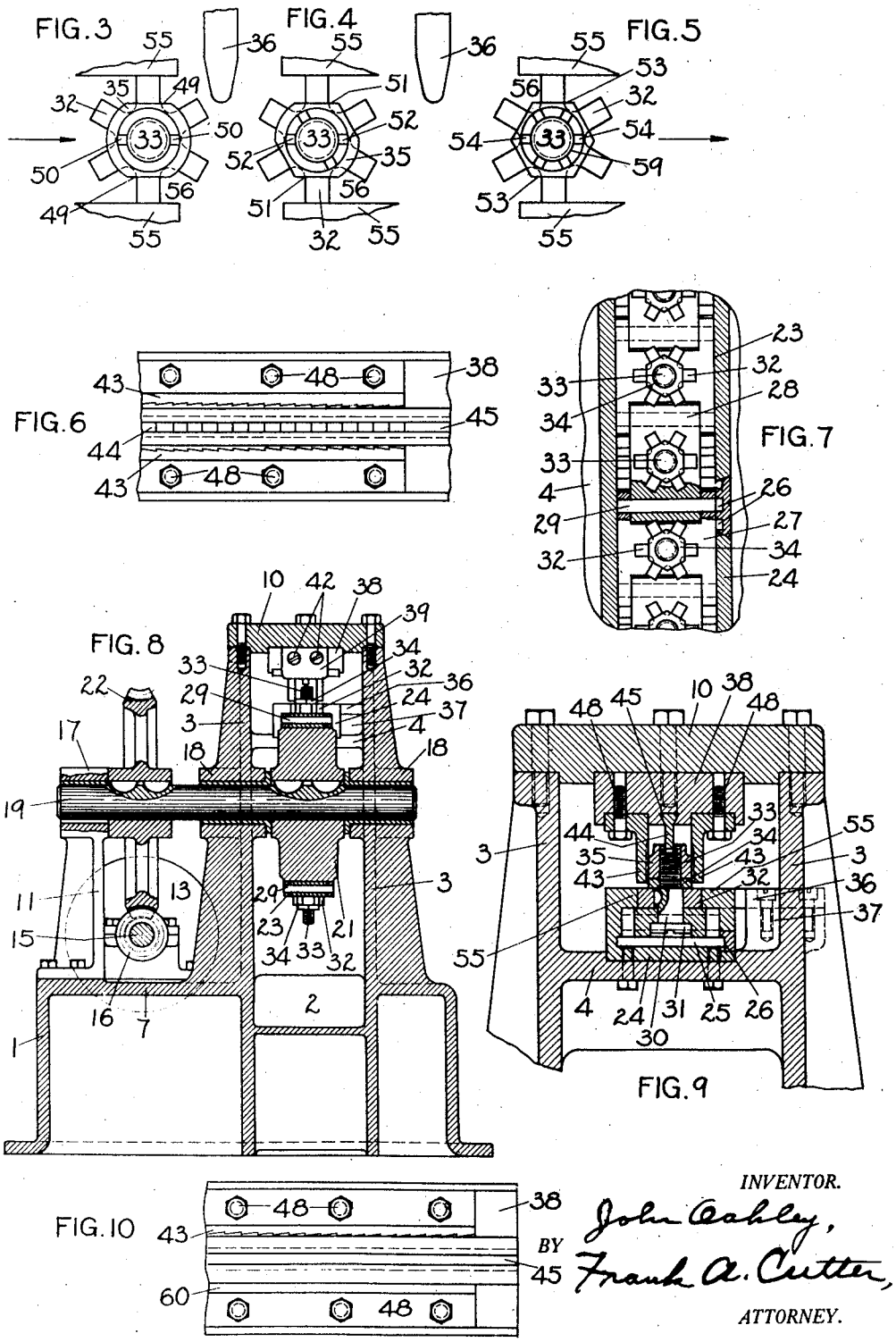

Patented Nov. 20, 1928.

1,692,564

UNITED STATES PATENT OFFICE.

JOHN OAKLEY, OF SPRINGFIELD, MASSACHUSETTS, ASSIGNOR, BY MESNE ASSIGNMENTS, TO PERKINS MACHINE AND GEAR COMPANY, OF SPRINGFIELD, MASSACHUSETTS, A CORPORATION OF MASSACHUSETTS.

BROACHING MACHINE.

Application filed September 22, 1926. Serial No. 137,014.

My invention relates to improvements in machines for finishing plain surfaces, and consists generally of a suitable frame, a fixed broach or broaches, means, preferably in the form of an endless chain or its equivalent, to carry the work in a straight path in contact with said broach or broaches, indexing means when required, driving mechanism for the carrier or chain, and such other parts and members as may be necessary or desirable in order to render the machine complete and serviceable in every respect, all as hereinafter set forth.

The primary object of my invention is to produce a machine wherewith in a practically continuous operation objects, such as castellated nuts, can be accurately and expeditiously produced from cylindrical blanks previously bored and internally screw-threaded. This machine is comparatively inexpensive and simple in construction and also simple in operation.

In this machine the object to be broached may have its sides progressively formed in pairs while said object travels continuously through the machine, and also may have slots cut in the upper end thereof in correspondence numerically with the sides formed thereon. If the object to be produced be a hexagonal nut, two opposite sides of the same and two slots are first cut, the slots being in the top, then two more opposite sides and two additional slots are cut, and finally the last two sides and the last two slots are cut. The broaches for cutting the slots may be omitted, in which event only the sides of the object are cut; a four-sided object can be cut as well as a six-sided object, or an object may be finished on one side only; and it is possible to cut an object having more than six sides, in my machine, as will hereinafter more clearly appear.

Other objects and advantages will appear in the course of the following description.

I attain the objects and secure the advantages of my invention by the mechanism illustrated in the accompanying drawings, in which—

Figure 1:
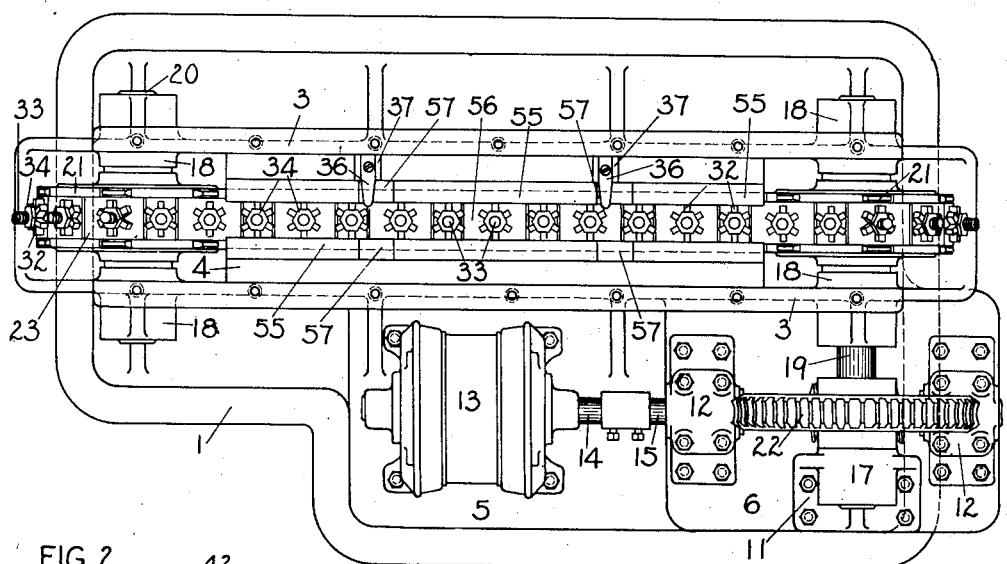
Figure 2:
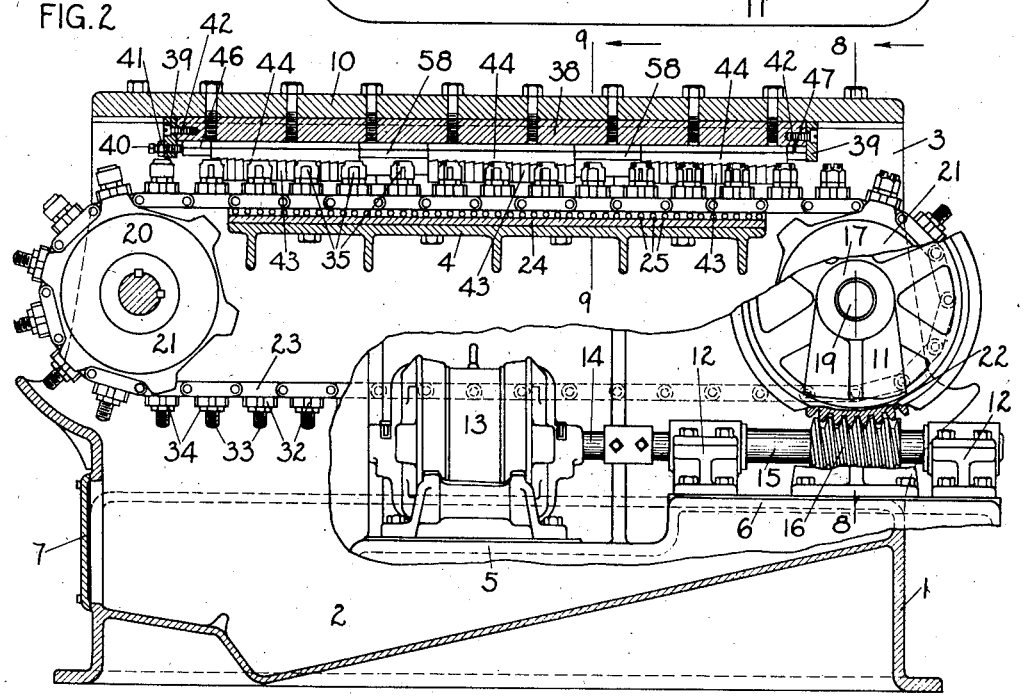

Figure 1 is a top plan, without the superimposed plate, broach holder, and broaches, of a machine which embodies a practical form of my invention, said machine being equipped to produce hexagonal, castellated nuts; Fig. 2, a longitudinal, vertical section through said machine, with parts in elevation; Fig. 3, a greatly enlarged, top plan of fragments of the guide, one of the work-holding members with the work thereon, and the index-wheel on said member, showing the first or initial cuts made by the broaches in said work; Fig. 4, a similar plan showing the second set of cuts, after the first indexing operation; Fig. 5, still another plan of a similar character showing the last set of cuts, after the second indexing operation; Fig. 6, an enlarged, bottom plan of a fragmentary portion of the broach holder, with portions in place therein of the broaches in one set; Fig. 7, an enlarged, top plan of a fragmentary portion of the sprocket-chain and the work-holding and -indexing parts and members carried thereby, and also a section through a portion of the sprocket-chain guide; Fig. 8, a transverse, vertical section through the machine, taken on lines 8—8, looking in the direction of the associated arrow, in Fig. 2; Fig. 9, an enlarged, transverse, vertical section, on lines 9—9, looking in the direction of the associated arrow, Fig. 2, and, Fig. 10, a bottom plan similar to Fig. 6, but showing a side-cutting broach on one side only, and no end-cutting broach.

Similar reference characters designate similar parts throughout the several views.

The left- and right-hand ends of the machine, as disposed in the first two views, are the front and rear ends, respectively; and the lower and upper sides of said machine, as disposed in Fig. 1, are the front and back sides, respectively.

The frame of the machine, illustrated in connection herewith, comprises a hollow base 1 in which is a compartment 2 to receive the chips and waste matter produced during the broaching operation, two parallel walls 3 rising from the top of said base and extending lengthwise thereof, a horizontal floor or support 4 extending between said walls but having each end somewhat remote from the ends of the walls, and platforms or beds 5 and 6, the latter being at a somewhat higher elevation than the former. The beds 5 and 6 are forward of the front wall 3, and together constitute a top part for a portion of the base 1. The bed 6 is located at the rear end and the bed 5 intermediate of the ends of the frame, and the former extends beyond the back end of the base 1. A clean-out door 7 is provided at the front end of the compartment 2. A plate 10 is mounted on the walls 3, over the space between them, and bolted or otherwise secured to said walls.

Secured to the bed 6 adjacent to the front and rear edges thereof is an upright 11, and also secured to said bed are two bushed bearings 12. The bearings 12 are in line with each other, and so positioned as to locate their axial centers in a plane between the upright 11 and the front wall 3. A motor 13 is secured to the bed 5, with the axis of the motor shaft 14 in line with the aforesaid axial centers of the bearings 12. A shaft 15 is journaled in the bearings 12 and coupled to the motor shaft 14. The shafts 14 and 15 are parallel with the sides of the frame. Mounted on and secured to the shaft 15 is a worm 16 which is located in the space between the upright 11 and the front wall 3. At the top of the upright 11 is a bushed bearing 17, and in line with this bearing are two bushed bearings 18 in the walls 3. A transverse shaft 19 is journaled in the bearings 17 and 18. The walls 3, adjacent to their front ends, are provided with other bushed bearings 18, and a shaft 20 is journaled in said bearings. The shaft 20 is similar to the shaft 19 except that the former is shorter than the latter. The shafts 19 and 20 are in the same horizontal plane, and mounted on each between the walls 3 is a sprocket-wheel 21. Mounted on and secured to the shaft 19 inside of the bearing 17 is a worm-wheel 22 which intermeshes with the worm 16. A sprocket-chain 23 connects the sprocket-wheels 21. The sprocket-chain 23 is the carrier for the work.

When the motor 13 is in operation, its shaft 14 drives the shaft 15 and the worm 16, and said worm drives the worm-wheel 22, the shaft 19, the sprocket-wheel 21 on said shaft 19, and the sprocket-chain 23 and front sprocket-wheel 21.

A guide 24 for the upper reach of the sprocket-chain 23, which upper reach passes above the floor 4, is provided for said sprocket-chain. The guide 24 is let into and bolted or otherwise secured to the floor 4, in the longitudinal center of the space between the walls 3; and said guide is in the form of an open-end channel having at the top inwardly-extending flanges 55—55 between which is a longitudinal slot 56—see Figs. 1 and 9. There are also two pairs of oppositely-disposed, transverse slots or recesses 57 in the top of the guide 24, intermediate of the ends thereof, as can be plainly seen in Fig. 1. A plurality of anti-friction rollers 25 may be provided for that portion of the sprocket-chain 23 which passes through the guide 24, said rollers having their ends journaled in one side of said guide and in a longitudinal bar 26 secured in the other side of said guide after said rollers have been placed in position. The sprocket-chain 23 in passing through the guide 24 rides on the rollers 25. These rollers might be omitted and the sprocket-chain permitted to travel on and in direct contact with the bottom of the guide.

The sprocket-chain 23 consists of wide and narrow links 27 and 28, respectively, with each pair of contiguous links pivotally connected at 29, as illustrated in Fig. 7. This sprocket-chain does not differ materially from the ordinary type, but each of its links has journaled in the center thereof a work-holding member, here presented in the form of a screw 30. The head 31 of the screw 30 is inset in the inner side of its link (27 or 28), said screw extends outwardly through said link, has a toothed index-wheel 32 mounted on and secured thereto, is shouldered outside of said wheel, and has a screw-threaded outer terminal 33 to receive a nut 34 and the work, such as a blank 35 which is to be formed into a castellated nut. The head 31 of the screw 30 and the nut 34 thereon against the shouldered part thereof hold said screw against endwise movement in the link (27 or 28), but permit it to be rotated therein. The slot 56 in the top of the holder 24 is wide enough to permit the index-wheel on the screw to pass therethrough, and said index-wheel is so located on said screw, inside of the nut 34 on the screw, that the index-wheel passes through said slot with the traveling sprocket-chain 23. The maximum diameter of the index-wheel 32 is less than the width of the narrow links 28, consequently portions of said links, as well as of the wide links 27, pass beneath the overhanging flanges 55 of the guide 24.

Two index-fingers 36 are let into and secured to two lugs 37 that rise from the floor 4 behind the guide 24. The index-fingers 36 extend forwardly into the recesses 57 in the rear flange 55 and back side of the guide 24, and into the path of the index-wheel teeth which are contiguous with the back side of the slot 56.

Let into the underside of the plate 10, and bolted or otherwise secured to said plate, is a bar that constitutes a broach holder 38. This holder is directly above the guide 24, and secured to the ends thereof are depending lugs 39—39. Tapped into the front lug 39 is a horizontal bolt 40. The bolt 40 is in the vertical center of the front lug, and below the bottom level of the holder 38, and has a set-nut 41 thereon in front of said lug. The lugs 39 are fastened to the holder 38 by means of screws 42 which pass through said lugs to be tapped into said holder.

As illustrated in Figs. 6, 8, and 9, there are three sets of broaches carried by the holder 38, each set consisting of two side-cutting broaches 43 and an end-cutting broach 44. The broaches in each set are of equal lengths, and the three sets are spaced equal distances apart. Each broach 44 is between two of the broaches 43.

There is a dove-tail slot 45 in the longitudinal center of the bottom of the holder 38, and the upper edge of each end-cutting broach 44 is shaped to fit said slot. The teeth are on the bottom edges of the broaches 44. The depth of each broach 44 is greater at the rear than at the front end, in order to enable the teeth to cut properly. In other words, the cutting edges of the teeth are on a plane which inclines downwardly and rearwardly from front to back, as is customary. The rear end portion of each broach 44 is of a depth, when said broach is located in the holder 38, to cut slots of the required depth in the work. A filler or spacer 46 is inserted between the bolt 40 and the adjacent end of the foremost broach 44, a spacer 47 is inserted between the back lug 39 and the adjacent end of the rearmost broach 44, and spacers 58—58 are inserted between adjacent ends of said two broaches and the intermediate broach 44. These spacers have their upper edges formed, like the upper edges of the central, end-cutting broaches, to fit the slot 45, and except in length said spacers are alike. Upon removing either screw 42 and the lug 39 held in place thereby, the way is open for inserting or withdrawing the broaches 44 and the spacers 46 and 47 in or from the holder 38. After the broaches 44 and the spacers have been inserted in the slot 45 in the holder, they are rigidly secured in place by screwing the bolt 40 tightly against the front end of the foremost spacer and thereby forcing the spacers and broaches into close contact at the ends and the rearmost spacer hard against the back lug 39.

The side-cutting broaches 43 are inverted L-shaped in cross section, and they are let into the underside of the holder 38 and secured thereto by means of bolts 48 which pass upwardly through the horizontal parts of said broaches to be tapped into said holder from below. The broaches 43 are arranged in pairs, and those in each pair are located on opposite sides of one of the broaches 44, with the horizontal parts of said first-named broaches extending outwardly. The teeth of the broaches 43 are on the inside of the vertical parts thereof, and extend upwardly from the bottom edges of said parts. The distance between the serrated parts of the broaches 43 in each pair at the ends is equal to the distance between two parallel sides of the blank 35 when cut, but the planes in which the cutting edges of the broach teeth are located converge slightly from front to rear, in the usual manner and for the usual reason. It will now be understood that the broaches 43 and 44 in each set make their deepest cuts with their rear-end portions. The broaches 43 can be removed from the holder 38 simply by unscrewing the bolts 48.

As each blank 35 is carried between the broaches 43 and beneath the broach 44 in each set, opposite sides of said blank are cut by said broaches 43 to form two parallel sides on the blank and two slots are cut by said broach 44 in the top of the blank, such slots being in line with each other and extending through the edge portions at the top of the blank from the outer to the inner periphery thereof, and parallel with the aforesaid sides.

The broaches 43 extend downwardly below the level of the tops of the nuts 34 on the screws 30, as the latter are carried by the sprocket-chain 23 through the guide 24, consequently said broaches are in position to act on blanks 35 mounted on said screws above said nuts. The broaches 44 project below the holder 38 a sufficient distance to make the required cuts in a blank 35, when in position on one of the screws 30 and nuts 34, without cutting into said screw. It is to be understood that, when a blank 35 is screwed on to any screw 30 until said blank is in contact with the nut 34 on said screw, the screw penetrates the blank a sufficient distance to support it while being broached, but leaving a sufficient portion of the blank at the upper end free and clear to have the slots cut therein by the broaches 44 without the latter contacting with the screw.

The operation of the machine as a whole, and when equipped with three sets of broaches, is described as follows:

Assuming that the sprocket-chain 23 is in motion, an operator at the front end of the machine spins a blank 35 onto and into threaded engagement with each screw 30 above the nut 34 thereon as said screw arrives at or adjacent to the front entrance to the space between the walls 3. The blanks 35, thus placed in operative position on the moving sprocket-chain 23, are quickly carried into contact with the first set of broaches 43 and 44, by the upper reach of the sprocket-chain 23 as it passes through the guide 24 riding on the rollers 25. Each blank 35, after passing between the broaches 43 and under the broach 44 in the first set, emerges from said set with two opposite sides slabbed off or cut away, as illustrated at 49—49, and two slots cut in the top thereof, as illustrated at 50—50, in Fig. 3. When the blank thus cut leaves the first set of broaches, the index-wheel 32, on the screw 30 on which said blank is mounted, encounters the first index-finger 36 and has imparted thereto by said finger one-sixth of a revolution. The partial revolution thus imparted to the index-wheel is imparted to the screw and the blank thereon, with the result that said blank is caused to assume a new position and be in readiness to have two more sides cut thereon and two more slots cut therein. The blank in its new position next passes between the broaches 43 and under the broach 44 in the intermediate set, and has cut by said broaches the sides 51—51 thereon and the slots 52—52 therein. When the blank is clear of the intermediate set of broaches, the index-wheel below said blank encounters the second index-finger 36, and by reason of contact with said finger has imparted thereto a second one-sixth of a revolution (as shown in Fig. 4), which partial revolution is imparted to the blank through the medium of the screw 30 on which said index-wheel and blank are mounted. The blank is now in position and ready to have the remaining two sides cut thereon and the remaining two slots cut therein. These last-named sides and slots are cut by the third set of broaches 43 and 44, and are respectively indicated at 53—53 and 54—54, in Fig. 5. The blank thus faced off and slotted and thereby converted into a castellated nut, as 59, is removed after it leaves the third set of broaches and arrives at or adjacent to the rear end of the space between the walls 3, by an operator, at the rear end of the machine, who quickly spins said nut off of its supporting screw.

By the means and in the manner described above one blank after another is converted into a castellated nut in a practically continuous operation.

In passing through the slot 56 in the top of the guide 24, the outer ends of the transversely disposed teeth of the index-wheels 32 contact with the sides of said slot and thus prevent said index-wheels and the screws 30 on which they are mounted, with the blanks 35 on said screws, from rotating, except when said wheels arrive at the transverse spaces or recesses 57 provided in the guide flanges 55 for the accommodation of the index-fingers 36 and for indexing purposes. Without the recesses 57 in both flanges and opposite to each other, the index-wheels would be unable to turn. As it is, when each index-wheel 32 arrives at each pair of the oppositely-disposed recesses 57, the teeth of said index-wheel are clear of the guide flanges 55, and said wheel is free to be indexed by the index-fingers 36 that project into the back recesses, and is indexed. The broaches 43, and also the broaches 44, tend to prevent the blanks 35 from rotating as they pass between and in contact with said broaches.

In the event it be not desired to slot the work at the end, the broaches 44 are removed from the holder 28; and, in the event it be desired only so to slot the work, the broaches 43 are removed from the holder. All but one set of broaches is removed, when it is desired only to face off two sides of and cut a slot or slots parallel with said sides in the work. In this last event the index-fingers 36 are removed, inasmuch as the work is not indexed. If merely a slot or slots in one direction be all that is required, only one broach 44 is used; and if but two sides are to be faced off, without any slot or slots, only two broaches 43 are used, and here again no indexing takes place. Two complete sets only of broaches are employed for cutting square nuts, and the broaches 44 are omitted in the event said nuts are not to be castellated. The two broaches 43 are omitted and the two pairs of broaches 44 retained, when slots in two directions are desired, without the faced sides. For indexing purposes, in cutting square nuts, or slots in two directions, or both, index wheels having four teeth are substituted on the screws 30 for the index-wheels 32 having six teeth. Obviously there may be provided more than three complete sets of cutters to act on blanks which it is desired to convert into nuts or other objects having more than six sides, and more than three continuous or six interrupted slots. Here, again, the end-cutting broaches may be employed alone, or the side-cutting broaches may be employed alone. The index-wheels in these latter cases have two additional teeth, and an extra index-finger is provided, for each additional set of broaches, or each additional broach 44, or pair of broaches 43.

If one side only of an object is to be finished, a single broach 43 is attached to the holder 38 in position to act on such side, and an abutment 60 is attached to said holder in position to serve as a guide for said object while being carried past said broach and acted on thereby—see Fig. 10. The abutment 60 is similar to one of the broaches 43, except that said abutment is not serrated. By providing a plurality of broaches 43 on one side, with a plurality of abutments on guides on the other side, and using the indexing means or mechanism, a plurality of sides can be formed on an object. One or more of the end-cutting broaches may be used, if necessary, in connection with the single side-cutting broach and the opposite guide 60, or with pluralities of the two latter.

The end-cutting broaches may be used for facing-off as well as for slotting the work.

In addition to the changes and modifications hereinbefore specifically pointed out, other changes and modifications may be made in this machine, without departing from the spirit of my invention, or exceeding the scope of what is claimed.

What I claim as my invention, and desire to secure by Letters Patent, is—

1. In a broaching machine, a broach holder having a longitudinal dove-tail slot therein, and provided with end lugs, a bolt in one of said lugs, and broaches and spacers adapted to fit within said slot and be held at the ends between one of said lugs and said bolt in the other of said lugs.

2. In a broaching machine, a broach holder, broaches angular in cross section, and having teeth on the parts thereof that are parallel with each other, and means to secure the other parts of said broaches, those which extend outwardly from said parallel parts, to said holder.

JOHN OAKLEY.